United States Patent
Kekki

(10) Patent No.: US 9,769,726 B2
(45) Date of Patent: Sep. 19, 2017

(54) METHOD AND APPARATUS FOR CONSIDERING ROUTING INFORMATION IN THE DETERMINATION OF AN ACCESS NETWORK TO BE UTILIZED

(75) Inventor: Sammi Johannes Kekki, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 69 days.

(21) Appl. No.: 14/117,133

(22) PCT Filed: May 8, 2012

(86) PCT No.: PCT/FI2012/050443
§ 371 (c)(1),
(2), (4) Date: Nov. 12, 2013

(87) PCT Pub. No.: WO2012/156581
PCT Pub. Date: Nov. 22, 2012

(65) Prior Publication Data
US 2014/0185524 A1     Jul. 3, 2014

Related U.S. Application Data

(60) Provisional application No. 61/486,501, filed on May 16, 2011.

(51) Int. Cl.
*H04W 40/02* (2009.01)
*H04L 12/725* (2013.01)
(Continued)

(52) U.S. Cl.
CPC ........... *H04W 40/02* (2013.01); *H04L 45/308* (2013.01); *H04L 47/122* (2013.01); *H04W 48/16* (2013.01);
(Continued)

(58) Field of Classification Search
USPC ................................................ 370/328–338
See application file for complete search history.

(56) References Cited

U.S. PATENT DOCUMENTS

| 2005/0272466 | A1* | 12/2005 | Haverinen | .......... H04L 12/2801 |
| | | | | 455/552.1 |
| 2009/0303881 | A1* | 12/2009 | Tsirtsis | ................ H04W 60/005 |
| | | | | 370/235 |

(Continued)

FOREIGN PATENT DOCUMENTS

| CN | 101043387 A | 9/2007 | |
| DE | WO 2010037422 A1 * | 4/2010 | ......... H04L 41/0806 |

(Continued)

OTHER PUBLICATIONS

Draves et al., "Default Router Preferences and More-Specific Routes", Request for Comments: 4191, Nov. 2005, pp. 1-15.

(Continued)

*Primary Examiner* — Jamal Javaid
*Assistant Examiner* — Kyaw Z Soe
(74) *Attorney, Agent, or Firm* — Mintz Levin Cohn Ferris Glovsky and Popeo, P.C.

(57) ABSTRACT

A method, apparatus and computer program product are provided to allow a plurality of access networks to be utilized in a coordinated manner in accordance with the routing policies defined by the network operator as well as other routing information including, for example, IETF routing and router information. In the context of a method, information, such as ANDSF information, defining the routing policies of the network operator may be received from a mobile terminal. The method also includes at least a portion of the information defining one or more routing policies of the network operator within an IP connectivity stack along with other routing information that is not based on the routing policies of the network operator. And, the method considers both the one or more routing policies defined by the network operator and the other routing (Continued)

information in determining utilization of a plurality of access networks.

17 Claims, 4 Drawing Sheets

(51) Int. Cl.
*H04L 12/803* (2013.01)
*H04W 48/16* (2009.01)
*H04L 12/801* (2013.01)
*H04W 48/18* (2009.01)
*H04W 80/04* (2009.01)
*H04W 88/06* (2009.01)

(52) U.S. Cl.
CPC .............. *H04L 47/14* (2013.01); *H04W 48/18* (2013.01); *H04W 80/04* (2013.01); *H04W 88/06* (2013.01)

(56) References Cited

U.S. PATENT DOCUMENTS

| | | | | |
|---|---|---|---|---|
| 2010/0165882 A1* | 7/2010 | Palanki | ................ | H04W 8/005 370/254 |
| 2010/0296415 A1* | 11/2010 | Sachs | ................... | H04W 48/18 370/254 |
| 2011/0044253 A1* | 2/2011 | Zisimopoulos | ....... | H04W 48/16 370/328 |
| 2011/0286395 A1* | 11/2011 | Liebsch | ................ | H04W 40/18 370/328 |
| 2012/0008551 A1* | 1/2012 | Giaretta | ............ | H04W 36/0011 370/328 |
| 2012/0177003 A1* | 7/2012 | Chan | ................. | H04W 36/0066 370/331 |
| 2012/0188949 A1* | 7/2012 | Salkintzis | ............. | H04L 45/308 370/329 |
| 2013/0272287 A1* | 10/2013 | Xiang | ................... | H04W 48/14 370/338 |
| 2014/0016557 A1* | 1/2014 | Savolainen | ......... | H04W 40/248 370/328 |
| 2015/0327153 A1* | 11/2015 | Tervonen | .............. | H04W 48/08 370/235 |

FOREIGN PATENT DOCUMENTS

| | | | | |
|---|---|---|---|---|
| EP | 2362695 | | 8/2011 | |
| FI | WO 2011058395 A1 * | 5/2011 | ............ | H04W 48/14 |
| WO | 2010069601 | | 6/2010 | |
| WO | 2010148551 | | 12/2010 | |
| WO | 2011050835 | | 5/2011 | |
| WO | 2012/137039 A1 | | 10/2012 | |

OTHER PUBLICATIONS

"3rd Generation Partnership Project; Technical Specification Group Core Network and Terminals; Access Network Discovery and Selection Function (ANDSF) Management Object (MO) (Release 10)", 3GPP TS 24.312, v10.2.1, Apr. 2011, pp. 1-153.

"IETF Tools for Traffic Offloading Complementary to ANDSF", 3GPP TSG SA WG2 Meeting #85, S2-112477, Agenda Item: 9.11, Work Item / Release: OPIIS/Rel-11, May 16-20, 2011, pp. 1-4.

"Solution With Inter-APN Routing Policies", 3GPP TSG SA WG2 Meeting #84, TD S2-111733, Agenda Item: 9.11, Work Item / Release: OPIIS/Rel-11, Apr. 11-15, 2011, pp. 1-4.

Extended European Search Report received for corresponding European Patent Application No. 12785693.8, dated Oct. 8, 2014, 6 pages.

International Search Report received for corresponding Patent Cooperation Treaty Application No. PCT/FI2012/050443, dated Aug. 17, 2012, 4 pages.

Written Opinion received for corresponding Patent Cooperation Treaty Application No. PCT/FI2012/050443, dated Aug. 17, 2012, 8 pages.

3rd Generation Partnership Project; Technical Specification Group Core Network and Terminals; Access to the 3GPP Evolved Packet Core (EPC) via non-3GPP access networks; Stage 3 (Release 10).

* cited by examiner

METHOD AND APPARATUS FOR CONSIDERING ROUTING INFORMATION IN THE DETERMINATION OF AN ACCESS NETWORK TO BE UTILIZED

RELATED APPLICATION

This application was originally filed as PCT Application No. PCT/FI2012/050443 filed May 8, 2012, which claims benefit of priority from U.S. Application No. 61/486,501, filed May 16, 2011.

TECHNOLOGICAL FIELD

Example embodiments of the present invention relate generally to communications technology and, more particularly, the selection of one or more access networks from among a plurality of access networks in accordance with routing information.

BACKGROUND

In some instances, multiple access networks are available in order to support communications with a mobile terminal or other communications device. For example, system architecture evolution (SAE) introduces the evolved packet core (EPC) network that accommodates both third generation partnership project (3GPP) access networks, such global system for mobile communications (GSM)/enhanced data rate for global evolution (EDGE) radio access networks (GERANs), universal mobile telecommunications system (UMTS) terrestrial radio access networks (UTRANs), high speed packet access (HSPA) networks and evolved UTRANs (E-UTRANs), as well as non-3GPP access networks, such as wireless local area networks (WLANs). In SAE, an access network discovery and selection function (ANDSF) is introduced to allow a network operator to steer or control the flow of communications to and from a mobile terminal over different access networks in a controlled fashion based upon ANDSF policies. In this regard, the ANDSF policies include routing policies that instruct the mobile terminal as to which access network to utilize for certain types of network communications. For example, the ANDSF policy may instruct the mobile terminal to utilize WLAN access for internet browsing and to utilize a 3GPP access network for all other types of network communications.

In some instances, non-seamless WLAN offloading may be supported. For example, the 3GPP specification provides support for non-seamless WLAN offloading. In regards to non-seamless WLAN offloading, the session of the mobile terminal that is conducted over the WLAN is not anchored in the core network of the network operator, but, instead, the WLAN session is conducted without traversing the gateway of any cellular operator.

In one implementation, split-user equipment (UE) is provided that includes both a terminal equipment and a mobile terminal The terminal equipment may be a computer, such as a laptop computer or the like, or any other type of computing device that implements an internet protocol (IP) connectivity stack, e.g., a transmission control protocol (TCP)/IP stack. While the mobile terminal may be a mobile telephone, a portable digital assistant (PDA) or other type of mobile terminal The terminal equipment and the mobile terminal may be connected, such as by means of a wireless connection, such that the mobile terminal can provide some of the functions of the mobile terminal for the terminal equipment.

In a split UE scenario, the terminal equipment and the mobile terminal may communicate with different access networks. For example, the terminal equipment may communicate with a WLAN, while the mobile terminal communicates with a cellular network. Although the mobile terminal may include the ANDSF and may consequently interact with access networks based upon the ANDSF policies, the terminal equipment does not include the ANDSF and, as such, does not support the ANDSF policies. however, the terminal equipment may still receive other routing information, such as internet engineering task force (IETF) routing and router information, such as defined by REF 4191, via the connection that the terminal equipment has established with an access network, such as the WLAN. In the split UE scenario, the terminal equipment may directly communicate with some access networks, such as WLANs, but the mobile terminal may provide the connection to other access networks, such as the cellular access networka. Thus, the mobile terminal in a split UE scenario may transparently bridge the connection from the terminal equipment to the radio networks.

The routing information may not be coordinated. For example, the ANDSF routing policy and the IETF routing and router information may not be coordinated. As such, the behavior of the split UE may differ from that expected by the cellular operator that expects that the ANDSF routing policies will steer or direct the communications from the split UE. Absent coordination, however, the IETF routing and router information may sometime cause the split UE to establish communications with the various access networks in a different manner than that directed by the ANDSF routing policies. By way of example, the ANDSF routing policy may indicate, pursuant to the preference of the cellular operator, that all internet traffic is to be routed through the WLAN and the remainder of the traffic is to be routed over 3GPP access network(s). If, however, the IETF routing and router information, such as the router advertisements/default router preferences, indicates that a router reachable over the WLAN has a lower preference than a router reachable over a 3GPP access network, the operating system of the terminal equipment may route the internet traffic to the 3GPP access network due to its higher default router preference and not the WLAN as indicated by the ANDSF routing policies. In this regard, although the mobile terminal may include the ANDSF routing policies, the terminal equipment does not include the ANDSF routing policies and, as a result, may rely upon other routing information, such as the IETF router and routing information, to direct the traffic to different access networks than those contemplated by the ANDSF routing policies. By steering the traffic in a manner different than that defined by the ANDSF routing policies and, as a result, different than that expected by the network operator, the user of the split UE may have a less desirable and/or more expensive user experience.

BRIEF SUMMARY

The method, apparatus and computer program product are therefore provided in accordance with one embodiment of the present invention to allow a plurality of access networks to be utilized in a coordinated manner in accordance with the routing policies defined by the network operator, such as with ANDSF information, as well as other routing information including, for example, IETF routing and router information. Thus, the terminal equipment in a split UE scenario may utilize a plurality of access networks not only based upon the IETF routing and router information, but also based upon the ANDSF information or other routing information provided by the network operator. In this regard, the terminal equipment may select an access network following consideration of all of the various types of routing information as well as the respective preferences associated with the routing information. As such, the terminal equipment in a split UE scenario may utilize the access networks in the manner contemplated by a network operator such that the resulting user experience and the costs of that user experience may be improved.

In one embodiment, a method is provided that includes receiving information from a mobile terminal, such as Access Network Discovery and Selection Function (ANDSF) information, defining one or more routing policies of the network operator. For example, the method may mirror the information regarding the routing policies of the network operator via an application, such as an ANDSF application, that has access to the IP connectivity stack. Alternatively, the method may mirror the information regarding the routing policies of the network operator natively into the IP connectivity stack. The method also includes at least a portion of the ANDSF information defining one or more routing policies within an Internet Protocol (IP) connectivity stack along with other routing information. And, the method considers both the one or more routing policies defined by the information regarding the routing policies of the network operator and the other routing information in determining utilization of a plurality of access networks. In this regard, the method of one embodiment may determine an order of precedence between the one or more routing policies defined by the network operator and the other routing information in an instance in which the one or more routing policies defined by the network operator and the other routing information are in conflict.

In another embodiment, an apparatus is provided that includes at least one processor and at least one memory including computer program code with the at least one memory and the computer program code configured to, with the at least one processor, cause the apparatus to at least receive information from the mobile terminal, such as Access Network Discovery and Selection Function (ANDSF) information, defining one or more routing policies of the network operator. For example, the apparatus may be caused to mirror the information regarding the routing policies of the network operator via an application, such as an ANDSF application, that has access to the IP connectivity stack. Alternatively, the apparatus may be caused to mirror the information regarding the routing policies of the network operator natively into the IP connectivity stack. The at least one memory and the computer program code are also configured to, with the at least one processor, cause the apparatus to include at least a portion of the information defining one or more routing policies of the network operator within an Internet Protocol (IP) connectivity stack along with other routing information. And, the at least one memory and the computer program code are further configured to, with the at least one processor, cause the apparatus to consider both the one or more routing policies defined by the network operator and the other routing information in determining utilization of a plurality of access networks. In this regard, the apparatus of one embodiment may be caused to determine an order of precedence between the one or more routing policies defined by the network operator and the other routing information in an instance in which the one or more routing policies defined by the network operator and the other routing information are in conflict.

In a further embodiment, a computer program product is provided that includes a computer-readable medium bearing computer program code embodied therein for use with a computer with the computer program code including code for receiving information from a mobile terminal, such as Access Network Discovery and Selection Function (ANDSF) information, defining one or more routing policies of the network operator. For example, the code may mirror the information regarding the routing policies of the network operator via an application that has access to the IP connectivity stack. Alternatively, the code may mirror the information regarding the routing policies of the network operator natively into the IP connectivity stack. The computer program code also includes code for including at least a portion of the information defining one or more routing policies of the network operator within an Internet Protocol (IP) connectivity stack along with other routing information. And, the computer program code includes code for considering both the one or more routing policies defined by the network operator and the other routing information in determining utilization of a plurality of access networks. In this regard, the code of one embodiment may determine an order of precedence between the one or more routing policies defined by the network operator and the other routing information in an instance in which the one or more routing policies defined by the network operator and the other routing information are in conflict.

In yet another embodiment, an apparatus is provided that includes means for receiving information from a mobile terminal, such as Access Network Discovery and Selection Function (ANDSF) information, defining one or more routing policies of the network operator. For example, the apparatus may include means for mirroring the information regarding the routing policies of the network operator via an application that has access to the IP connectivity stack. Alternatively, the apparatus may include means for mirroring the information regarding the routing policies of the network operator natively into the IP connectivity stack. The apparatus also includes means for including at least a portion of the information defining one or more routing policies of the network operator within an Internet Protocol (IP) connectivity stack along with other routing information. And, the apparatus includes means for considering both the one or more routing policies defined by the network operator and the other routing information in determining utilization of a plurality of access networks. In this regard, the apparatus of one embodiment may include means for determining an order of precedence between the one or more routing policies defined by the network operator and the other routing information in an instance in which the one or more routing policies defined by the network operator and the other routing information are in conflict.

BRIEF DESCRIPTION OF THE SEVERAL VIEWS OF THE DRAWINGS

Figure 1:
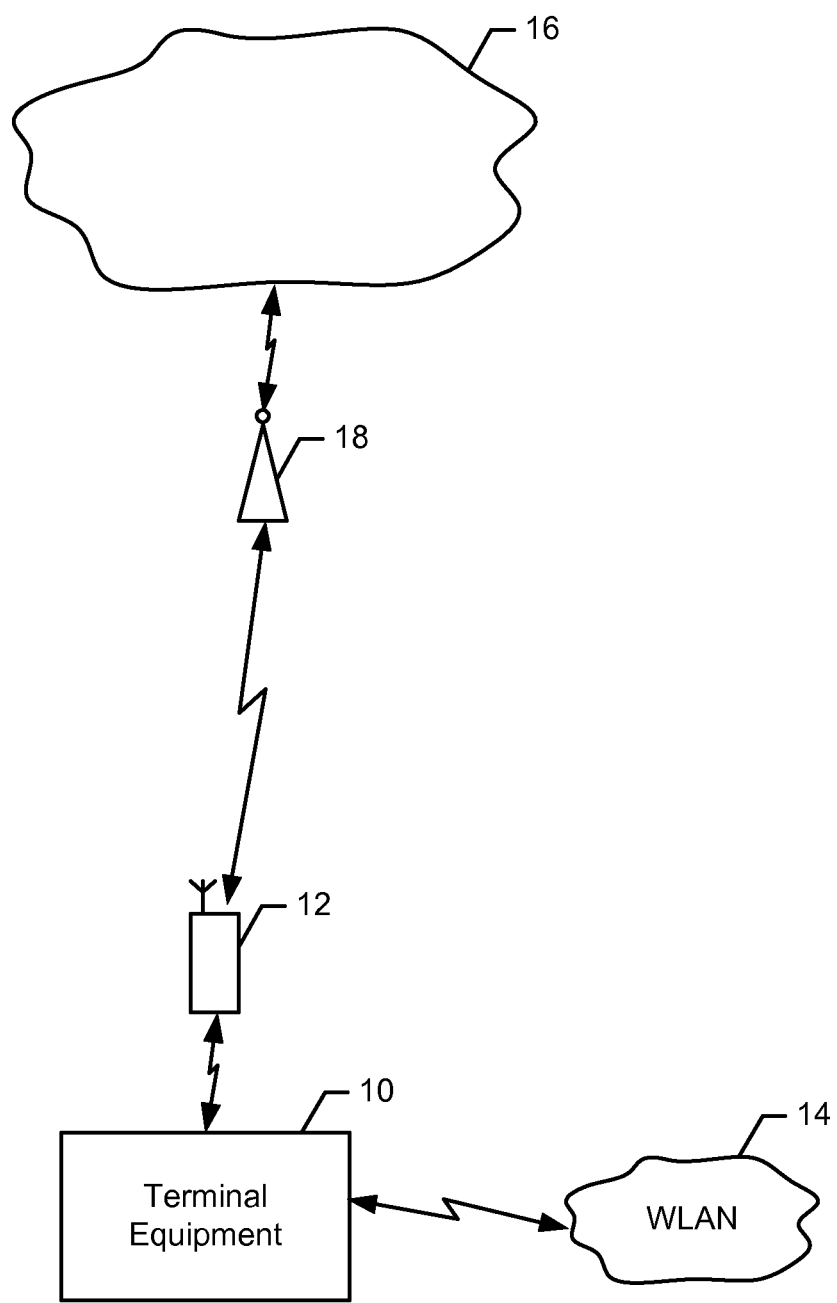
Figure 2:
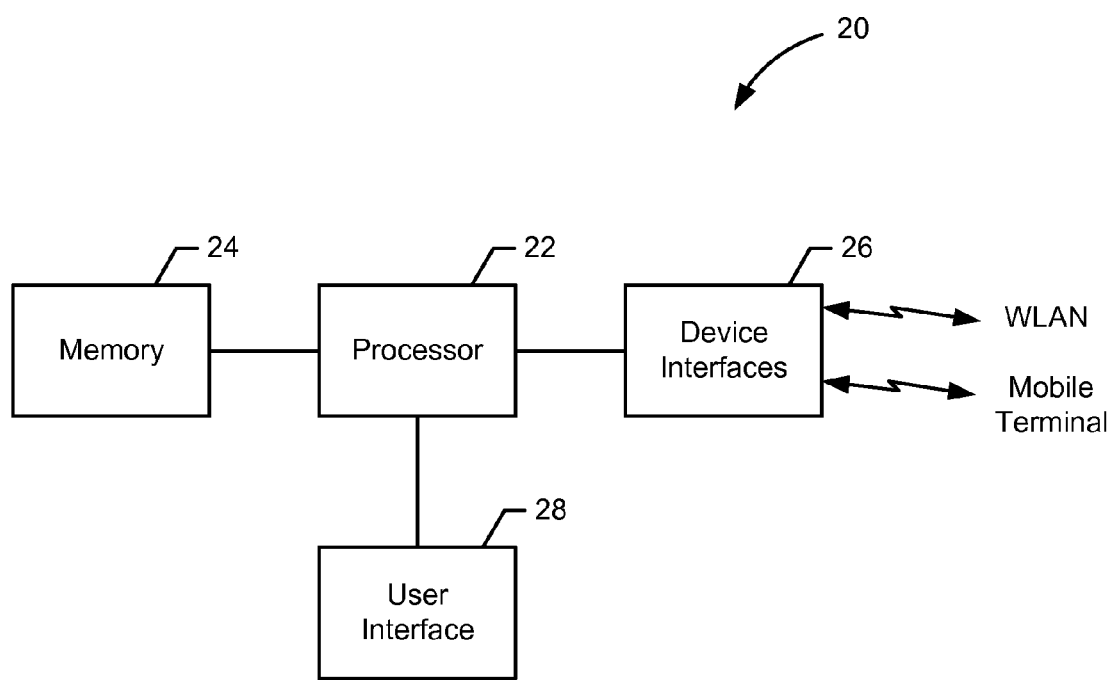
Figure 3:
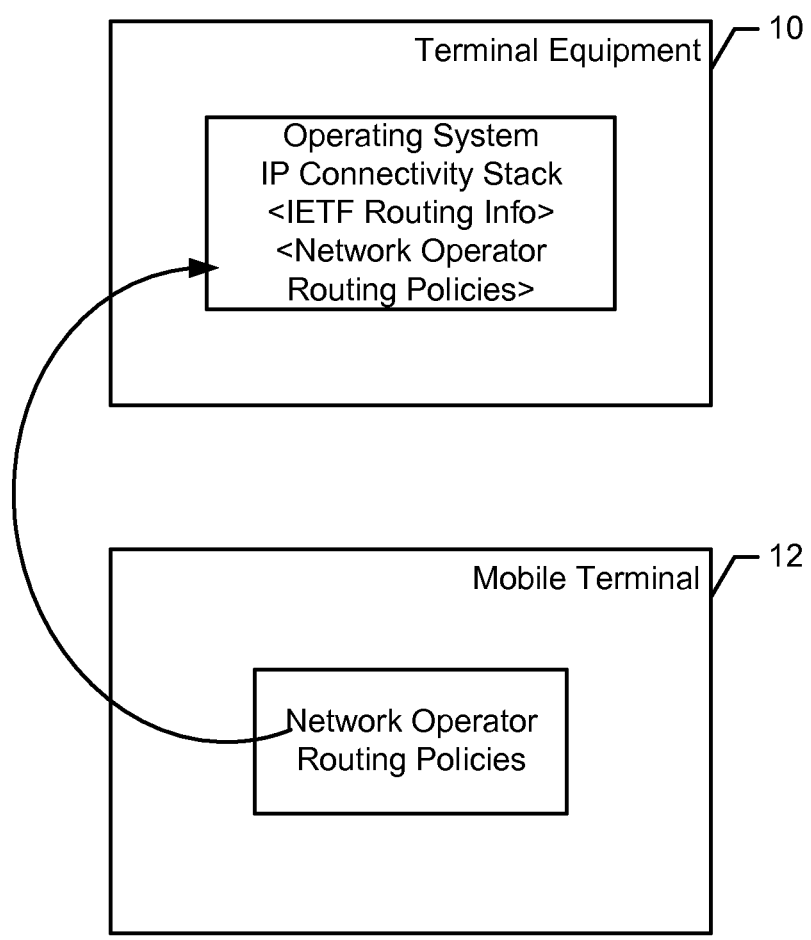
Figure 4:
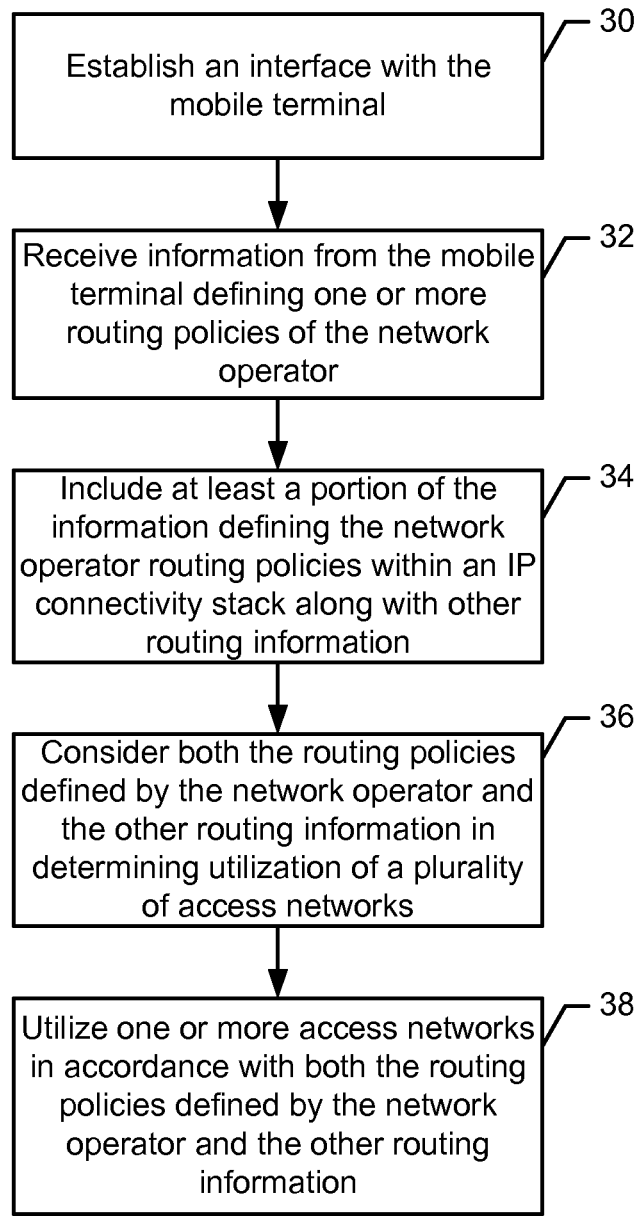

Having thus described some embodiments of the invention in general terms, reference will now be made to the accompanying drawings, which are not necessarily drawn to scale, and wherein:

FIG. 1 is a block diagram of a system that supports a split UE scenario in accordance with one embodiment of the present invention;

FIG. 2 is a block diagram of a terminal equipment in accordance with one embodiment of the present invention;

FIG. 3 is a schematic representation of the terminal equipment and the mobile terminal in a split UE scenario as well as the routing information maintained by the terminal equipment and the mobile terminal in accordance with one embodiment of the present invention; and FIG. 4 is a flowchart illustrating the operations performed in accordance with one embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

In accordance with an example embodiment of the present invention, a mobile terminal is configured to provide an apparatus, such as a terminal equipment, with information defining the routing policies of the network operator. The information defining the routing policies of the network operator is made available by the network operator and it is intended to be used for controlling or at least instructing the mobile terminal 12 regarding the manner in which to utilize network resources or the manner in which to locate network(s) to be used. While various types of information may be provided, Access Network Discovery and Selection Function (ANDSF) information, such as ANDSF routing information, may be provided in one embodiment. As another example, Policy and Charging Control (PCC) information could provide the routing policies of the network operator. As such, the methods, apparatus and computer program products of an example embodiment of the present invention support the more predictable utilization of one or more access networks by the terminal equipment and a mobile terminal in a split-UE scenario, thereby potentially improving the user experience and/or the costs associated with the network access.

The methods, apparatus and computer program products of an example embodiment may be utilized in conjunction with various wireless communications systems, one of which is shown in FIG. 1. As shown in FIG. 1, a system in accordance with an example embodiment of the present invention comprises the terminal equipment 10 in communication with a first communication device, e.g., mobile terminal 12. While the terminal equipment and the mobile terminal may be configured to communicate in various manners, the terminal equipment and the mobile terminal may be configured to communicate wirelessly, such as via Bluetooth™ or another proximity based wireless link, in one embodiment. Once communicably connected, the terminal equipment and the mobile terminal may be configured to operate as a split-UE with the mobile terminal providing the terminal equipment with at least some of its mobile terminal functionality, such as by supporting access to one or more cellular networks.

The terminal equipment 10 may be embodied in various manners, but, in one example embodiment, is a computer, such as a laptop computer, or other computing device. While the terminal equipment may be portable, such as in an embodiment in which the terminal equipment is embodied by a laptop computer, the terminal equipment may be a fixed computing device, such as a personal computer or workstation in other embodiments. The mobile terminal 12 may also be embodied in a variety of different manners including, for example, mobile telephones, PDAs, universal serial bus (USB) or other dongles, personal computer (PC) emulator cards, pagers, mobile televisions, gaming devices, all types of computers (e.g., laptops or mobile computers), cameras, audio/video players, radios, global positioning system (GPS) devices, or any combination of the aforementioned, and other types of communications devices.

The terminal equipment 10 and the mobile terminal 12 may be configured to communicate with one or more access networks, such as to, in turn, access a core network. The terminal equipment may be configured to access one or more access networks, such as one or more proximity-based networks represented, for example, by the wireless local area network (WLAN) 14 in FIG. 1. However, the mobile terminal may be configured to access one or more access networks, such as cellular networks, that the terminal equipment is unable to directly access. By way of example, FIG. 1 illustrates the mobile terminal being in communication with a network 16, such as a cellular access network, via a base station 18, such as a Node B, an evolved Node B (eNB), an access point or the like, and, in one embodiment, via a packet data network (PDN) gateway (PGW). While a single proximity-based network, e.g., WLAN 14, and a single access network 16 are shown in the illustration of FIG. 1, the communications system may include a plurality of such networks in other embodiments with the terminal equipment and/or the mobile terminal configured to establish connections with one or more of the access networks. As a result of the split-UE configuration, the mobile terminal can therefore provide the terminal equipment with access, albeit indirectly via the mobile terminal, with one or more access networks 16 that the terminal equipment is otherwise unable to access directly.

In an example embodiment, the access network 16 is configured by a network operator and includes a collection of various different nodes, devices or functions that are capable of communication with each other via corresponding wired and/or wireless interfaces. As such, the illustration of FIG. 1 should be understood to be an example of a broad view of certain elements of the system and not an all inclusive or detailed view of the system or the access network. Although not necessary, in some embodiments, the access network may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), LTE advanced (LTE-A), and/or the like. For example, the access network may be a GERAN, UTRAN, HSPA or E-UTRAN access network.

An example embodiment of an apparatus 20 that may be embodied by or comprise at least a portion of the terminal equipment 10 will now be described with reference to FIG. 2. It should be noted, however, that the devices or elements described below may not be mandatory and thus some may be omitted in certain embodiments. Referring now to FIG. 2, the apparatus of the illustrated embodiment may include or otherwise be in communication with a processor 22, a memory device 24, a device interface 26 and a user interface 28. The memory device may comprise, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, applications, instructions or the like for enabling the apparatus to carry out various functions in accordance with example embodiments of the present invention. For example, the memory device could be configured to buffer input data for processing by the processor. Additionally or alternatively, the memory device could be configured to store instructions for execution by the processor.

The apparatus 20 may, in some embodiments, be a computing device, such as a laptop computer. However, in some embodiments, the apparatus may be embodied as a chip or chip set (which may in turn be employed at one of the devices mentioned above). In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry comprised thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may comprise one or more processing cores configured to perform independently. A multi-core processor may enable multiprocessing within a single physical package. Additionally or alternatively, the processor may comprise one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a computing device) adapted for employing an embodiment of the present invention by further configuration of the processor by instructions for performing the algorithms and/or operations described herein. The processor may comprise, among other things, a clock, an arithmetic logic unit (ALU) and logic gates configured to support operation of the processor.

Meanwhile, the device interface 26 may be any means such as a device or circuitry embodied in either hardware or a combination of hardware and software that is configured to receive and/or transmit data from/to a network, such as an access network, e.g., WLAN 14, and/or any other device or module in communication with the apparatus 20, such as the mobile terminal 12. In this regard, the device interface may comprise, for example, an antenna (or multiple antennas) and supporting hardware and/or software for enabling communications with a wireless communication network, e.g., WLAN. In some environments, the device interface may alternatively or also support wired communication. As such, for example, the device interface may comprise a communication modem and/or other hardware/software for supporting communication via cable, digital subscriber line (DSL), universal serial bus (USB) or other mechanisms. In addition to supporting communications, such as wireless communications, with an access network, the device interface may be configured to support communications, such as wireless communications, e.g., via a Bluetooth™ link, with another device, such as the mobile terminal to facilitate split UE operations.

The user interface 28 may be in communication with the processor 22 to receive an indication of a user input at the user interface and/or to provide an audible, visual, mechanical or other output to the user. As such, the user interface may comprise, for example, a keyboard, a mouse, a joystick, a display, a touch screen(s), touch areas, soft keys, a microphone, a speaker, or other input/output mechanisms. For example, in an embodiment in which the apparatus 20 is embodied as the terminal equipment 12, the user interface may comprise, among other devices or elements, any or all of a speaker, a microphone, a display, and a keyboard or the like. In this regard, for example, the processor may comprise user interface circuitry configured to control at least some functions of one or more elements of the user interface, such as, for example, a speaker, ringer, microphone, display, and/or the like. The processor and/or user interface circuitry comprising the processor may be configured to control one or more functions of one or more elements of the user interface through computer program instructions (e.g., software and/or firmware) stored on a memory accessible to the processor (e.g., memory device 24, and/or the like).

As described above in conjunction with FIG. 1 and as shown in FIG. 3, the terminal equipment 10 and the mobile terminal 12 may be connected to one another, such as via a wireless communication link, such as via a Bluetooth™ link, so as to function as a split UE. While the terminal equipment may communicate directly with one or more local networks, such as a WLAN 14 as shown in FIG. 1, the mobile terminal may provide at least some functions for the terminal equipment, such as by transparently bridging the connection from the terminal equipment to one or more other access networks, such as one or more radio access networks 16 as also shown in FIG. 1, in order to allow the split UE to communicate with one or more access networks in the manner anticipated by the network operator and, more particularly, in accordance with the routing policies established by the network operator.

As shown in FIG. 3, for example, the routing policies of the network operator, such as the ANDSF routing policies, may be stored by the mobile terminal 12, such as in memory, so as to direct the manner in which the mobile terminal establishes communications with one or more access networks 16. In accordance with an embodiment to the present invention, the mobile terminal provides the routing policies of the network operator to the terminal equipment 10 and the terminal equipment, in turn, receives the routing policies of the network operator. In one embodiment, the terminal equipment stores the routing policies of the network operator, such as in the memory device 24, such that the operating system of the terminal equipment may thereafter have access to the routing policies of the network operator. For example, the routing policies of the network operator, such as the ANDSF routing policies, may be incorporated within an IP connectivity stack along with other routing information, that is, routing information other than that provided by the network operator, such as IETF routing information, that is maintained by the operating system of the terminal equipment. Thereafter, in instances in which the terminal equipment is to establish connectivity with one or more access networks, the terminal equipment may consider the routing policies of the network operator as well as any other routing information, such as IETF routing information, e.g., IETF routing and router information, in the determination of which one(s) of the plurality of access networks is to be utilized. By providing the routing policies of the network operator to the terminal equipment and by configuring the terminal equipment to take the routing policies of the network operator into consideration in determining which access network to utilize, the terminal equipment and, more generally, the split UE may operate in closer conformity to the manner in which the network operator that defined the routing policies expected the split UE to perform. As a result, the resulting user experience and/or the cost incurred by the user may be improved.

In order to provide further details, FIG. 4 is provided, which is a flowchart of a system, method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody a mechanism for implementing the functions specified in the flowchart block(s). These computer program instructions may also be stored in a non-transitory computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 4, when executed, convert a computer or processing circuitry into a particular machine configured to perform an example embodiment of the present invention. Accordingly, the operations of FIG. 4 define an algorithm for configuring a computer or processing circuitry (e.g., processor 22) to perform an example embodiment. In some cases, a general purpose computer may be configured to perform the functions shown in FIG. 4 (e.g., via configuration of the processor), thereby transforming the general purpose computer into a particular machine configured to perform an example embodiment.

Accordingly, blocks of the flowchart support combinations of means for performing the specified functions, combinations of operations for performing the specified functions and program instructions for performing the specified functions. It will also be understood that one or more blocks of the flowchart, and combinations of blocks in the flowchart, can be implemented by special purpose hardware-based computer systems which perform the specified functions or operations, or combinations of special purpose hardware and computer instructions.

As illustrated in operation 30 of FIG. 4 from the perspective of the terminal equipment 10, the apparatus 20 may include means, such as the processor 22, the device interface 26 or the like, for establishing an interface with the mobile terminal 12. While the interface may be established in various manners, a wireless interface is established in one embodiment, such as via a Bluetooth™ or other proximity-based wireless link. Once the interface between the terminal equipment and the mobile terminal has been established, the terminal equipment and mobile terminal may collaborate to function as a split UE.

As shown in operation 32 of FIG. 4, the apparatus 20 may include means, such as the processor 22, the device interface 26 or the like, for receiving, once the interface has been established with the mobile terminal 12, information from the mobile terminal, such as ANDSF information, that defines one or more routing policies of the network operator. Although the information that defines the routing policies of the network operator may be provided at any point following the establishment of the interface, the information that defines the routing policies of the network operator is provided in accordance with one embodiment at the time at which the interface is established or created. As shown in FIG. 3, the information that defines the routing policies of the network operator may be well structured, such as by including ANDSF management objects, and, as such, may be received by the operating system, such as a Windows 7 operating system, of the terminal equipment 10 and included, for example, within the IP connectivity stack maintained by the operating system of the terminal equipment along with any other routing information, such as IETF routing information, that is provided to or maintained by the terminal equipment.

The terminal equipment 10 may receive the information, such as ANDSF information, defining the routing policies of the network operator from the mobile terminal 12 in various manners. For example, the apparatus 20 may include means, such as the processor 22, the device interface 26 or the like, for mirroring the information defining the routing policies of the network operator with an application, such as an ANDSF application, that has access to the IP connectivity stack of the terminal equipment. Alternatively, the apparatus may include means, such as the processor, the device interface or the like, for mirroring the information defining the routing policies of the network operator natively into the IP connectivity stack of the terminal equipment. The information defining the routing policies of the network operator may be provided in various manners including utilization of Ovi Suite, PC Suite, or any other similar device vendor specific application that is used for connecting the mobile terminal device with the terminal equipment, As shown in FIG. 3, the information defining the routing policies of the network operator may be included within the IP connectivity stack that is maintained and/or accessible by the operating system of the terminal equipment 10. As such, the apparatus 20 may include means, such as the processor 22, the memory device 24 or the like, for including at least a portion of the information defining one or more routing policies of the network operator, such as ANSDF information, within the IP connectivity stack along with other routing information, such as IETF routing information, e.g., IETF defined routing and router information, that is not indicative of the routing policies of the network operator. See operation 34 of FIG. 4. By providing the routing policies of the network operator to the terminal equipment, such as for inclusion within the IP connectivity stack along with other routing information, the routing policies of the network operator may be taken into account by the terminal equipment in the determination of the access network(s) that are utilized by the terminal equipment. In this regard, the apparatus may include means, such as the processor or the like, for considering both the routing policies defined by the network operator, such as the ANDSF routing policies, as well as other routing information, such as the IETF routing information, in determining the utilization of a plurality of access networks. See operation 36 of FIG. 4.

In this regard, the terminal equipment 10, such as the processor 22, may consider all of the routing information including the routing policies of the network operator and the other routing information, such as the IETF routing information, to determine which access network is preferred and should be utilized for different types of communications, such as internet access or the like. For example, the combination of the routing policies of the network operator and the other routing information may define an order or preference by which one or more access networks are to be accessed by the terminal equipment for different types of communications. Additionally, the terminal equipment, such as the processor, may include or have access to one or more rules for resolving conflicts between the routing policies of the network operator and other routing information, such as the IETF routing information. As such, these rules may define which, if either, routing information to follow in an instance in which the routing policies of the network operator and the other routing information, such as IETF routing information, differ from one another. In other words, the rules for resolving conflicts may define an order of precedence between the routing policies of the network operator and the other routing information in an instance in which the different types of routing information otherwise conflicts with one another.

As shown in operation 38 of FIG. 4, the apparatus 20 may also include means, such as the processor 22, the device interface 24 or the like, for thereafter utilizing one or more of the access networks following consideration of both the routing policies defined by the network operator, such as ANDSF information, and the other routing information, such as the IETF routing information. Thus, the terminal equipment 10 may communicate with one or more access networks in a manner that is consistent with that anticipated by the network operator. Accordingly, the resulting user experience may be improved and/or the costs associated with a network access may be improved.

In one embodiment, the apparatus 20 may include means, such as the processor 22, the user interface 28 or the like, for permitting a user to authorize, or not, the transfer the information regarding the routing policies of the network operator from the mobile terminal 12 to the terminal equipment 10. Once authorized, the transfer of this information may proceed, such as upon establishment of the interface between the terminal equipment and the mobile terminal in the manner described above. While the rules for resolving conflicts between different routing policies may be predefined and stored, for example, by memory device 24, the apparatus of one embodiment may include means, such as the processor, the user interface or the like, for receiving direction from the user regarding the manner in which conflicts between the routing policies of the network operator and the other routing information are to be resolved, that is, to define which of the conflicting routing policies takes precedence.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving by a terminal equipment, from a mobile terminal, access network discovery and selection function information, wherein the access network discovery and selection function information defines one or more routing policies of a network operator, the one or more routing policies being indicative of a preferred access network and an order of precedence by which one or more access networks are to be used for a specific type of communication, the terminal equipment and the mobile terminal being arranged in a split configuration to utilize one or more access networks;
   including, within an internet protocol connectivity stack, at least a portion of the access network discovery and selection function information and other routing information; and
   determining, based on the at least the portion of the access network discovery and selection function information and the other routing information, utilization of one or more access networks;
   wherein the receiving comprises mirroring the access network discovery and selection function information natively into the internet protocol connectivity stack.

2. A method according to claim 1, wherein the receiving the access network discovery and selection function information comprises mirroring the access network discovery and selection function information via an access network discovery and selection function application having access to the internet protocol connectivity stack.

3. A method according to claim 1, further comprising:
   establishing an interface with the mobile terminal and receiving the access network discovery and selection function information when the interface is established.

4. A method according to claim 3, wherein the access network discovery and selection function information is received at the time that the interface with the mobile terminal is established.

5. A method according to claim 1, wherein the determining, based on the at least the portion of the access network discovery and selection function information and the other routing information, utilization comprises determining an order of precedence between the one or more routing policies defined by the access network discovery and selection function information and the other routing information.

6. A method according to claim 5, wherein the determining the order of precedence comprises determining an order of precedence in an instance in which the one or more routing policies defined by the access network discovery and selection function information and the other routing information are in conflict.

7. A method according to claim 1, wherein the other routing information comprises internet engineering task force routing and router information.

8. A method according to claim 1, further comprising:
   utilizing the one or more access networks in accordance with the one or more routing policies defined by the access network discovery and selection function information and the other routing information.

9. An apparatus comprising:
   at least one processor; and
   at least one memory including computer program code, the at least one memory and the computer program code configured to, with the at least one processor, cause the apparatus embodied in a terminal equipment to at least:
   receive by the terminal equipment, from a mobile terminal, access network discovery and selection function information, wherein the access network discovery and selection function information defines one or more routing policies of a network operator, the one or more routing policies being indicative of a preferred access network and an order of precedence by which one or more access networks are to be used for a specific type of communication, the terminal equipment and the mobile terminal being arranged in a split configuration to utilize one or more access networks;
   include, within an internet protocol connectivity stack, at least a portion of the access network discovery and selection function information and other routing information; and
   determine, based on the at least the portion of the access network discovery and selection function information and the other routing information, utilization of one or more access networks;
   wherein receipt of the access network discovery and selection function information comprises mirroring the access network discovery and selection function information natively into the internet protocol connectivity stack.

10. An apparatus according to claim 9, wherein the at least one memory and the computer program code are configured to, with the at least one processor, cause the apparatus to at least receive the access network discovery and selection function information by mirroring the access network discovery and selection function information via an access network discovery and selection function application having access to the internet protocol connectivity stack.

11. An apparatus according to claim 9, wherein the at least one memory and the computer program code are further configured to, with the at least one processor, cause the apparatus to at least establish an interface with the mobile terminal and receive the access network discovery and selection function information when the interface is established.

12. An apparatus according to claim 11, wherein the access network discovery and selection function information is received at the time that the interface with the mobile terminal is established.

13. An apparatus according to claim 9, wherein the at least one memory and the computer program code are configured to, with the at least one processor, cause the apparatus to at least determine the utilization by determining an order of precedence between the one or more routing policies defined by the access network discovery and selection function information and the other routing information.

14. An apparatus according to claim 13, wherein the at least one memory and the computer program code are configured to, with the at least one processor, cause the apparatus to at least determine the order of precedence in an instance in which the one or more routing policies defined by the access network discovery and selection function information and the other routing information are in conflict.

15. An apparatus according to claim 9, wherein the other routing information comprises internet engineering task force routing and router information.

16. An apparatus according to claim 9, wherein the at least one memory and the computer program code are further configured to, with the at least one processor, cause the apparatus to at least utilize the one or more access networks in accordance with the one or more routing policies defined by the access network discovery and selection function information and the other routing information.

17. A computer program product comprising non-transitory computer-readable medium storing instructions that, when executed by at least one processor, cause the at least one processor to perform operations comprising:

receive by a terminal equipment, from a mobile terminal, access network discovery and selection function information, wherein the access network discovery and selection function information defines one or more routing policies of a network operator, the one or more routing policies being indicative of a preferred access network and an order of precedence by which one or more access networks are to be used for a specific type of communication, the terminal equipment and the mobile terminal being arranged in a split configuration to utilize one or more access networks;

include, within an internet protocol connectivity stack, at least a portion of the access network discovery and selection function information and other routing information; and determine, based on the at least the portion of the access network discovery and selection function information and the other routing information, utilization of one or more access networks;

wherein receipt of the access network discovery and selection function information comprises mirroring the access network discovery and selection function information natively into the internet protocol connectivity stack.

\* \* \* \* \*